(12) United States Patent
Schlensag et al.

(10) Patent No.: US 9,132,837 B2
(45) Date of Patent: Sep. 15, 2015

(54) METHOD AND DEVICE FOR ESTIMATING THE NUMBER OF LANES AND/OR THE LANE WIDTH ON A ROADWAY

(71) Applicant: Conti Temic microelectronic GmbH, Nuremberg (DE)

(72) Inventors: Andreas Schlensag, Wangen im Allgaeu (DE); Peter Irrgang, Achberg (DE); David Stenmanns, Bodolz (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 14/255,074

(22) Filed: Apr. 17, 2014

(65) Prior Publication Data

US 2014/0324325 A1    Oct. 30, 2014

(30) Foreign Application Priority Data

Apr. 26, 2013 (DE) .......................... 10 2013 104 256

(51) Int. Cl.
*B60W 40/06* (2012.01)

(52) U.S. Cl.
CPC ..................................... *B60W 40/06* (2013.01)

(58) Field of Classification Search
USPC ........................................................ 701/116
See application file for complete search history.

(56) References Cited

U.S. PATENT DOCUMENTS

| | | | | |
|---|---|---|---|---|
| 5,805,082 | A | * | 9/1998 | Hassett ........................ 340/928 |
| 5,821,879 | A | * | 10/1998 | Liepmann ..................... 340/942 |
| 6,219,613 | B1 | * | 4/2001 | Terrier et al. ................. 701/408 |
| 6,370,475 | B1 | * | 4/2002 | Breed et al. .................. 701/301 |
| 6,405,132 | B1 | * | 6/2002 | Breed et al. .................. 701/301 |
| 7,091,838 | B2 | | 8/2006 | Shimakage |
| 7,124,027 | B1 | * | 10/2006 | Ernst et al. ................... 701/301 |
| 7,289,059 | B2 | | 10/2007 | Maass |
| 7,411,486 | B2 | | 8/2008 | Gern et al. |
| 7,522,091 | B2 | * | 4/2009 | Cong et al. ...................... 342/70 |
| 7,782,179 | B2 | | 8/2010 | Machii et al. |
| 8,004,428 | B2 | | 8/2011 | Koenig |
| 8,065,084 | B2 | * | 11/2011 | Urban et al. .................. 701/301 |
| 8,108,134 | B2 | * | 1/2012 | Kageyama et al. ........... 701/117 |
| 8,184,859 | B2 | | 5/2012 | Tanji |
| 8,301,344 | B2 | | 10/2012 | Simon et al. |

(Continued)

FOREIGN PATENT DOCUMENTS

| | | |
|---|---|---|
| DE | 102005039167 | 2/2007 |
| DE | 102005044013 | 2/2007 |

(Continued)

OTHER PUBLICATIONS

German Search Report for German Application No. 10 2013 104 256.2, dated Dec. 4, 2013, 5 pages, Muenchen, Germany, with English translation, 5 pages.

*Primary Examiner* — Thomas Tarcza
*Assistant Examiner* — Alex C Dunn
(74) *Attorney, Agent, or Firm* — W. F. Fasse

(57) ABSTRACT

A system for estimating the lane width and/or the number of lanes on a roadway includes environmental sensors mounted on a vehicle to monitor respective detection areas behind and to the sides of the vehicle. The sensors detect a roadway edge and the system determines a distance to the roadway edge. The system further determines a value or accesses a predefined nominal value of a lane width, and then estimates the number of lanes by evaluating the roadway edge distance with reference to the lane width value.

21 Claims, 2 Drawing Sheets

(56) References Cited

U.S. PATENT DOCUMENTS

| | | |
|---|---|---|
| 8,330,592 B2 | 12/2012 | von Zeppelin et al. |
| 8,354,944 B2 | 1/2013 | Riegel et al. |
| 8,370,055 B2 | 2/2013 | Koehler et al. |
| 8,457,359 B2 | 6/2013 | Strauss et al. |
| 8,466,806 B2 | 6/2013 | Schofield |
| 8,543,254 B1 * | 9/2013 | Schut et al. .................. 701/1 |
| 8,615,357 B2 | 12/2013 | Simon |
| 8,847,790 B2 * | 9/2014 | Trum ..................... 340/932.2 |
| 2002/0036584 A1 * | 3/2002 | Jocoy et al. ................. 342/70 |
| 2005/0004731 A1 | 1/2005 | Bohm et al. |
| 2006/0151223 A1 | 7/2006 | Knoll |
| 2006/0161331 A1 | 7/2006 | Kumon et al. |
| 2009/0265070 A1 * | 10/2009 | Okada et al. ................ 701/70 |
| 2010/0157058 A1 | 6/2010 | Feiden |
| 2011/0063132 A1 * | 3/2011 | Trum ..................... 340/932.2 |
| 2012/0185167 A1 * | 7/2012 | Higuchi et al. ............. 701/461 |
| 2012/0277957 A1 * | 11/2012 | Inoue et al. ................. 701/41 |
| 2013/0151135 A1 * | 6/2013 | Aubrey et al. ............. 701/118 |
| 2014/0088862 A1 | 3/2014 | Simon |
| 2014/0152432 A1 | 6/2014 | Zobel et al. |

FOREIGN PATENT DOCUMENTS

| | | |
|---|---|---|
| DE | 102006034122 | 1/2008 |
| DE | 102007013685 | 9/2008 |
| DE | 102007016868 | 10/2008 |
| DE | 102008020007 | 10/2008 |
| DE | 102009016562 | 11/2009 |
| DE | 102009039450 | 5/2010 |
| DE | 102010033729 | 2/2012 |
| EP | 1 089 231 | 4/2001 |
| EP | 1 383 100 | 1/2004 |
| EP | 1 398 684 | 3/2004 |

* cited by examiner

METHOD AND DEVICE FOR ESTIMATING THE NUMBER OF LANES AND/OR THE LANE WIDTH ON A ROADWAY

PRIORITY CLAIM

This application is based on and claims the priority under 35 USC 119 of German Patent Application 10 2013 104 256.2, filed on Apr. 26, 2013, the entire disclosure of which is incorporated herein by reference.

FIELD OF THE INVENTION

The invention relates to the technical field of driver assistance systems for lane change warnings or lane change assistance.

BACKGROUND OF THE INVENTION

Present-day lane change warning functions, which shall warn of approaching traffic within a warning zone on the immediately adjacent neighboring lane, typically use a predefined fixed lane width. Knowledge of the lane width is essential to limit the warning zone, which shall only extend to the adjacent lane. Such an approach of using a fixed lane width is not able to adapt to changed environmental conditions. In particular, there is a large variation of the lane width as well as the number of lanes, in different regions worldwide or even within a country, e.g. on motorways and on construction sites. Thus, a warning zone approach based on a predefined fixed lane width leads to misjudgements of the driving situation on very narrow or very broad streets or lanes, because the warning zone is dimensioned too large or too small. This can lead to false-positive warnings (i.e. a warning is issued although there is no object on the neighboring lane, for example when the actual lane width is narrower than the fixed warning zone width, then a warning might be triggered by a vehicle on the next lane beyond the adjacent or neighboring lane), and false-negative lack of warnings (i.e. no warning is issued although there actually is a vehicle on the adjacent lane, for example when the actual lane width is wider than the fixed warning zone width then a vehicle on the adjacent lane might be erroneously evaluated as being on the next lane beyond the adjacent lane).

SUMMARY OF THE INVENTION

In view of the above, it is an object of at least some embodiments of the present invention to provide an improved method and an improved device for estimating the number of lanes and/or the lane width of lanes on a roadway. The invention further aims to avoid or overcome the disadvantages of the prior art, and to achieve additional advantages, as apparent from the present specification. The attainment of these objects is, however, not a required limitation of embodiments of the invention as set forth in the claims.

An embodiment of the invention relates to a method for a driver assistance system for a subject vehicle that drives on a roadway and that is equipped with a sensor system arranged to monitor a detection area laterally behind the subject vehicle. This method comprises steps: a) obtaining a lane width value of a lane width of a lane of the roadway; and b) evaluating sensor data from the sensor system and thereby attempting to recognize, from the sensor data, at least one roadway edge of the roadway. Furthermore, if the step b) recognizes the at least one roadway edge, then the method further involves performing the following steps: c) determining an edge distance of the at least one roadway edge; d) comparing the edge distance with the lane width value to produce a comparison result; and e) from the comparison result, determining an estimated number of lanes on the roadway.

By a method according to a further embodiment of the invention, the width of the adjacent or neighboring lane is determined or estimated, and the dimensions (e.g. especially the width) of a warning zone for a lane change assistant or warning system are adjusted based on or in view of the determined lane width. As an advantage compared to known approaches that use a fixed lane width or warning zone width, a lane change assistant according to such an embodiment of the invention can adapt itself to different environmental conditions or roadway conditions. In this way, both "false-positive" warnings and "false-negative" lack of warnings can be reduced or avoided, and the reliability of the driver assistance function can be increased. Furthermore, this allows a common system for lane departure warning to be provided for all markets world-wide, which can be operated without region-specific adaptations because such a system is automatically self-adapting.

A method according to another embodiment of the invention for estimating the number of lanes is applied in a vehicle comprising an environment sensor system for detecting the environment, which monitors an area laterally behind a vehicle. This monitored area is typical for a driver assistance system for lane change assistance. Typically, such environment sensors are embodied as radar or lidar systems, which determine the distance and/or relative speed to objects in the environment. According to an embodiment of the invention a distance to the roadway edge is determined and is compared with a presettable or predefined value for a lane width.

The comparison is made in particular by reference to a valid lane width interval or range, which is dependent on one's own speed, and which is predefined, or input, or selectable from among predefined ranges. Respective quotients are individually formed by dividing the distance to the roadway edge respectively by each one of different hypotheses for the number of lanes. For example, the different hypotheses of the number of lanes can be determined by method embodiments disclosed herein, or can simply be taken as a set of all typical numbers of lanes on typical roadways, e.g. 1, 2, 3, 4, 5 or 6 lanes. With such a set of six lane number hypotheses or "guesses", there would thus be six quotients formed. Each one of these quotients respectively represents a respective hypothesis for the current lane width. Then the lane width hypothesis that lies within the valid lane width range represents or is selected as the current estimated lane width value.

For estimating the number of lanes according to another embodiment of the invention, the distance to the street or roadway edge is divided by the previously defined lane width. In the result, the integral or whole number value represents the number of lanes, whereas any potential remainder (decimal places or fractional portion) is interpreted e.g. as a grass strip or as a spacing distance between the lane and the street edge.

In a further preferred embodiment of the invention, the presettable value for a lane width is set depending on the speed of one's own vehicle and on the highest absolute speed of all targets visible for the sensor. This process is based on the idea that a high speed is permitted only on a roadway having wide lanes, e.g. on a motorway or highway, whereas e.g. at construction sites only a reduced speed is permitted due to the smaller lane width at the construction sites. Further, e.g. other targets can have a higher absolute speed than one's own vehicle. Alternatively, information about the vehicle environment, e.g. whether the vehicle is located in an urban area, in a suburban or rural area, or on a highway or a motorway, is detected by means of the data of a camera system for detecting the environment, radio-based information systems (c2x) or navigation systems.

In a particular embodiment of the invention at least one of the following informations is used for recognizing the roadway edge with the system for detecting the environment:

a) Course of one's own driven lane: The course of one's own lane can be determined e.g. on the basis of the steering angle and of the speed of the vehicle (which are detected by suitable sensors in the vehicle).

b) Position of unmoved objects in the lateral area of the vehicle: Here, in particular such unmoved or stationary objects are meant, which lie in one plane with the sensor system for detecting the environment, this plane being perpendicular to the longitudinal axis of the vehicle. When using a radar system as a system for detecting the environment, these objects are also called 90 degree-reflections in accordance with their position.

c) Position of unmoved objects in the rear area of the vehicle: Here, such unmoved or stationary objects are those on the side and rear area of the vehicle, such as e.g. guard rails, roadway bounding reflectors, or the like.

Each one of the above informations a)-c) is representative for the lane course, which can aid in following the course of the roadway edge. The informations b) and c) indicate the lateral distance of the vehicle to a side limit or boundary, which aids in defining or recognizing where the roadway edge is located. The method described above is particularly suitable for a system for detecting the environment embodied as a radar system.

A further embodiment of the invention is directed to a driver assistance system for a vehicle, comprising a sensor system configured and arranged to monitor a detection area laterally behind the subject vehicle, a memory storing a program to perform the method according to any embodiment of the method invention herein, and a processing circuit (e.g. including a processor and/or a sensor data evaluation circuit) that is connected to the sensor system and to the memory, and that is configured to execute the program to perform the method.

BRIEF DESCRIPTION OF THE DRAWINGS

In order that the invention may be clearly understood, it will now be explained in further detail in connection with example is embodiments thereof, with reference to the accompanying drawings, wherein.

DETAILED DESCRIPTION OF PREFERRED EXAMPLE EMBODIMENTS AND THE BEST MODE OF THE INVENTION

Figure 1:
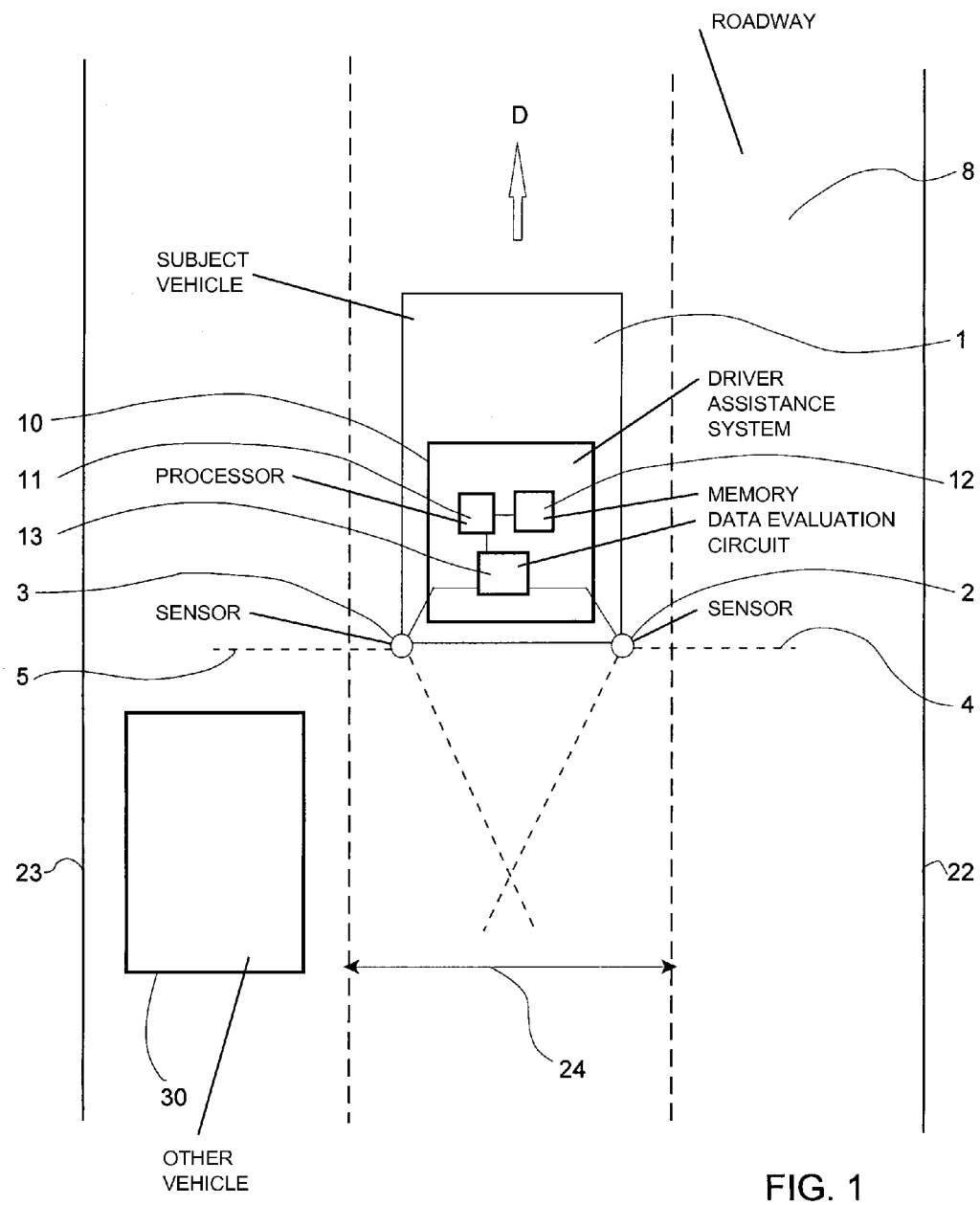
FIG. 1 is a schematic top plan view of a subject vehicle driving on a roadway, wherein the vehicle is equipped with a system according to the invention for estimating the number of lanes and/or determining the lane width on the roadway.

In the schematic top plan view of FIG. 1, a subject vehicle 1 as well as another vehicle 30 are driving in a driving direction D along a roadway 8. The subject vehicle 1 includes a right rear sensor system 2 and a left rear sensor system 3, which respectively detect objects and/or environmental surfaces respectively in a right rear detection area 4 and a left rear detection area 5 in the outside environment around the subject vehicle 1. The sensor systems 2 and 3 may include any known type or types of sensors such as radar sensors, lidar sensors, ultrasound sensors, cameras, etc.

The sensor systems 2 and 3 are components or are connected to a driver assistance system 10 such as a lane change warning or assistance system. The driver assistance system 10 further includes, for example, a processor 11, a memory 12 e.g. an electronic storage unit, and a sensor data evaluation circuit 13. The circuit 13 is embodied and configured to process or pre-process the data in the signals provided by the sensor systems 2 and 3 based on the detection in the respective right rear detection area 4 and the left rear detection area 5. The memory 12 stores a program or method sequence defining steps and operations to be performed in order to carry out one or more embodiments of a method according to the present invention, and may additionally store one or more programs or method sequences to perform one or more driver assistance functions such as lane change warning and/or lane change assistance either according to conventional methods or as supplemented by one or more methods or functions according to the invention. The memory 12 may further store the current sensor data, previous sensor data, sample sensor data, evaluation comparison data, evaluation threshold data, plausible numbers of lanes, plausible lane widths, a plausible or valid lane width range, and/or other data.

The processor 11, e.g. a computer processor unit, is embodied, configured and arranged to receive and execute the program(s) stored in the memory 12, so as to further evaluate or process the pre-processed data from the sensor systems via the sensor data evaluation circuit 13 as well as additional data that may be called up from the memory 12, and thereupon to make determinations or estimates of the number of lanes, the lane width, and other parameters and factors according to the embodiments of the present invention. The processor 11 further may adjust a warning zone for the lane change warning function based on the determined lane width. Furthermore, the processor 11 may generate or trigger output signals that may be warning signals for emitting a warning to the driver of the vehicle 1, or control signals that cause active control of the vehicle. Such operations may be according to any known driver assistance system or method.

Basically, for at least some embodiments of the method according to the invention, the driver assistance system 10 will attempt to recognize and locate at least one roadway edge such as the right roadway edge 22 and/or the left roadway edge 23. If the roadway edge 22 and/or 23 can be detected and recognized with a sufficient degree of assurance, then the system determines a distance of the roadway edge. The system also determines a lane width 24 or accesses a predefined value of the lane width 24 stored in the memory 12. The system 10, e.g. in the processor 11, can then determine a value or at least an estimate of the number of lanes on the roadway 8 based on comparing or evaluating the distance of the roadway edge with reference to the lane width. In one embodiment, the distance of the roadway edge refers to the distance from the vehicle 1 (or a respective sensor system 2 or 3 thereof) to one of the roadway edges 22 or 23. The determination of the number of lanes then relates to the number of lanes between the vehicle 1 and the respective detected roadway edge 22 or 23. Alternatively, in another embodiment, the distance of the roadway edge refers to the entire roadway width between the two roadway edges 22 and 23, if both roadway edges 22 and 23 have been successfully detected and located. In that case, the number of lanes determined by the evaluation is the total number of lanes of the roadway 8. In that case also, it is further possible to determine the position of the subject vehicle 1 on the roadway 8 and the number of lanes to the right of the vehicle 1 as well as the number of lanes to the left of the vehicle 1, in addition to the total number of lanes. It should further be understood that a "roadway" means any type of driving path for a vehicle, with or without lane markings, and with or without detectable roadway edges. If the roadway edges, or at least one roadway edge, cannot be detected, then the method according to an embodiment of the invention proceeds in a different manner, as will be described further below.

Figure 2A:
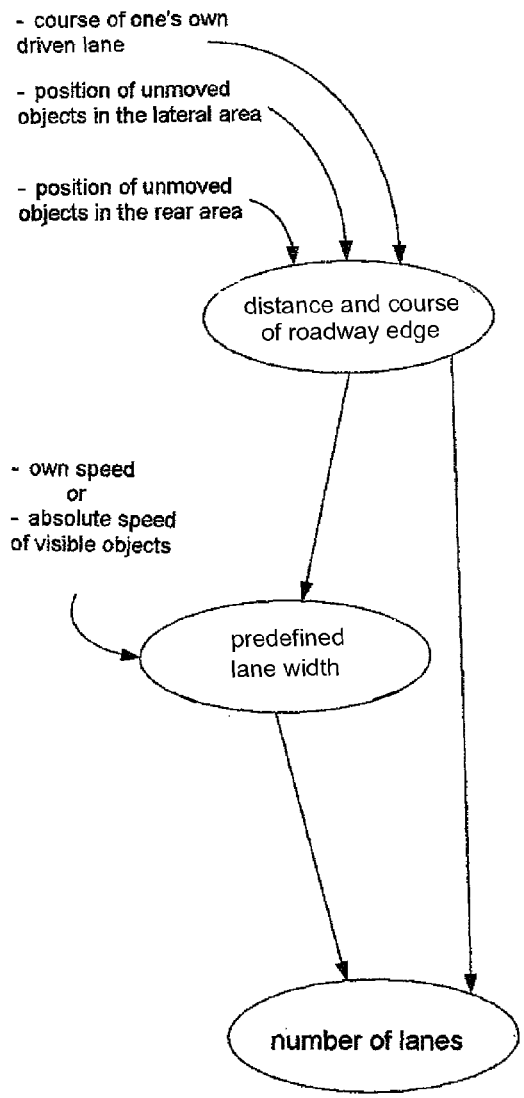
FIG. 2A is a schematic diagram for explaining an embodiment of a method according to the invention for estimating the number of lanes on a roadway when a roadway edge is recognizable by a sensor system of the vehicle.

FIG. 2A schematically represents an advantageous embodiment of a method according to the invention, for the situation in which the roadway edge (i.e. at least one of the roadway edges 22 or 23, or both roadway edges 22 and 23) is detectable by the sensor system 2 and/or 3 and then recognizable in the sensor data evaluation circuit 13 and/or processor 11. In that situation, the method for estimating the number of lanes proceeds as generally discussed above based on at least a value of a lane width 24 and a value of the distance of a roadway edge 22 and/or 23. The value of the lane width can be a predefined nominal value, for example a value selected from one or more possible nominal values of lane width stored in the memory 12. For example, the respective applicable nominal lane width value is selected based on the speed of the subject vehicle 1 or the absolute speed of visible objects detected by the sensor systems 2 and/or 3. Alternatively, rather than selecting among available stored nominal lane width values, the lane width value can be determined or set dependent on the speed of the subject vehicle or the absolute speed of other visible objects. Regarding the distance of the roadway edge, the method can further take into account the course of the roadway edge, and makes these determinations based on at least one of: the course of the subject vehicle's own lane, the position of unmoved or stationary objects in the lateral area to the side of the subject vehicle, and/or the position of unmoved or stationary objects in the rear area, for example as described above in the Summary of the Invention section of this application text. Those factors are used for recognizing, locating and following the roadway edge. The method then involves comparing or evaluating the spacing distance to the roadway edge with reference to the lane width. Particularly, this may involve forming a quotient of the spacing distance divided by the lane width, and determining the number of lanes from the resulting quotient, for example as described above.

Furthermore, once the number of lanes has been determined or estimated, the method may further determine the actual lane width from the determined number of lanes as well as the determined distance of the roadway edge(s). For example, by dividing the distance of the roadway edge by the number of lanes within that distance, the actual lane width can be determined.

Figure 2B:
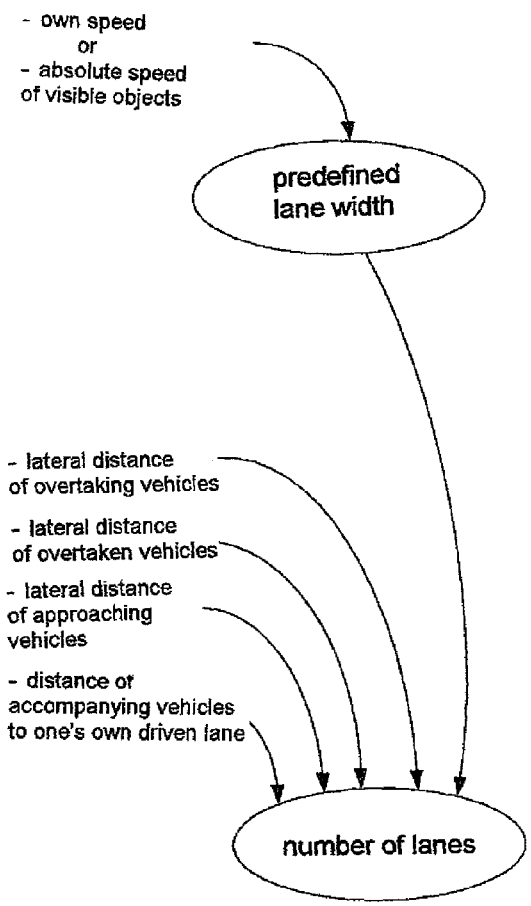
FIG. 2B is a schematic diagram for explaining an embodiment of a method according to the invention for estimating the number of lanes on a roadway when the roadway edge is not recognizable by the sensor system.

FIG. 2B schematically represents another advantageous embodiment of a method according to the invention, for the situation in which the roadway edge cannot be detected by the sensor systems or cannot be recognized by the evaluation circuit or the processor of the driver assistance system (or when the roadway edge distance is not to be used in the determination), e.g. in an open terrain area without roadside structures and/or without a well-defined roadway edge. In such a situation, the modified method provides that in addition to a presettable or predefined nominal value for a lane width, which is e.g. 3 m or 3.2 m, at least one of the following informations contributes to the estimation of the number of lanes:

a) lateral distance of vehicles that overtake the subject vehicle,
b) lateral distance of vehicles that are overtaken by the subject vehicle,
c) lateral distance of approaching vehicles,
d) lateral distance of following vehicles that are driving behind and laterally offset from the subject vehicle, wherein this lateral distance is determined as the lateral distance of the current longitudinal position of the following vehicle (i.e. another vehicle driving behind the subject vehicle) relative to the course of the lane (trajectory) on which the subject vehicle is driving.

In a preferred embodiment of the invention, the presettable or predefined nominal value for a lane width is set depending on the speed of the subject vehicle.

Furthermore, in the case that no roadway edge is recognized, in a preferred embodiment of the invention the actual width of the lane is estimated from the number of lanes and from at least one of the lateral distances a) to d) discussed above, and in particular depending on a predefined lane width or a lane width determined by the sensor system, for a lane of another vehicle or the lane of the subject vehicle.

Still further according to additional embodiment features of the invention, a warning zone for a lane change assistance system is determined and/or adjusted depending on the actual lane width, which has been determined with a method as described above.

With the inventive method it is possible to determine or estimate the number of lanes and/or the lane width, even without detecting lane markings and even if the roadway has no lane markings or only poor lane markings that cannot be reliably detected.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A method for a driver assistance system for a subject vehicle that drives on a roadway and that is equipped with a sensor system arranged to monitor a detection area along the roadway, wherein the method comprises the steps:
   a) in a processing circuit of the driver assistance system, obtaining a lane width value of a lane width of a lane of the roadway;
   b) in the processing circuit, evaluating sensor data from the sensor system and thereby attempting to recognize, from the sensor data, at least one roadway edge of the roadway; and
   if the step b) recognizes the at least one roadway edge, then further performing the following steps in the processing circuit:
   c) determining an edge distance of the at least one roadway edge;
   d) comparing the edge distance with the lane width value to produce a comparison result; and
   e) from the comparison result, determining an estimated number of lanes on the roadway.

2. The method according to claim 1, wherein in the step d), the comparing comprises dividing the edge distance by the lane width value to produce a quotient thereof as the comparison result.

3. The method according to claim 2, wherein the step e) comprises determining the estimated number of lanes as a whole number part of the quotient.

4. The method according to claim 1, wherein the at least one roadway edge consists of a single roadway edge on one side of the subject vehicle, the edge distance is a distance to the single roadway edge relative to the subject vehicle, and the estimated number of lanes is an estimated value of a number of one or more lanes on the roadway between the subject vehicle and the single roadway edge on the one side of the subject vehicle.

5. The method according to claim 1, wherein the at least one roadway edge includes two roadway edges respectively on opposite left and right sides of the subject vehicle, the edge distance is a distance between the two roadway edges, and the estimated number of lanes is an estimated value of a number of one or more lanes on the roadway between the two roadway edges.

6. The method according to claim 1, wherein the lane width value is a predefined nominal lane width value.

7. The method according to claim 6, wherein in the step a), the obtaining of the predefined nominal lane width value comprises setting or selecting the predefined nominal lane width value dependent on a speed of the subject vehicle or of objects detected by the sensor system.

8. The method according to claim 6, wherein in the step a), the obtaining of the predefined nominal lane width value comprises setting or selecting the predefined nominal lane width value dependent on informations regarding a surrounding environment in which the vehicle is located, wherein the informations are based on data from a camera system, a radio-based information system, or a navigation system of the subject vehicle.

9. The method according to claim 1, wherein in the step b), the recognizing of the at least one roadway edge further comprises determining and utilizing at least one of:
a) a course of a subject lane on which the subject vehicle is driving,
b) positions of stationary objects in a lateral area to a side of the subject vehicle,
c) positions of stationary objects in a rearward area behind the subject vehicle.

10. The method according to claim 1, further comprising, in the processing circuit, determining an actual lane width of the lane of the roadway from the edge distance determined in the step c) and the estimated number of lanes determined in the step e).

11. The method according to claim 10, wherein the determining of the actual lane width comprises forming a quotient of the edge distance divided by the estimated number of lanes.

12. The method according to claim 10, further comprising, in the processing circuit, determining a warning zone dependent on the actual lane width, and from the driver assistance system emitting a warning when an object is detected within the warning zone and the subject vehicle is commencing a lane change procedure.

13. The method according to claim 1, further comprising, in the processing circuit, determining a warning zone dependent on the number of lanes, and from the driver assistance system emitting a warning when an object is detected within the warning zone and the subject vehicle is commencing a lane change procedure.

14. A driver assistance system for performing the method according to claim 1 in a vehicle, comprising:
a sensor system configured and arranged to monitor a detection area along the roadway,
a memory storing a program to perform the method, and
a processing circuit that is connected to the sensor system and to the memory, and that is configured to execute the program to perform the method.

15. A method for a driver assistance system for a subject vehicle that drives on a roadway and that is equipped with a speed sensor and an environmental sensor system, wherein the method comprises the steps:
a) using the speed sensor, determining the driving speed of the subject vehicle;
b) determining a valid lane width range dependent on the driving speed;
c) using the environmental sensor system, detecting at least one roadway edge of the roadway;
d) determining an edge distance of the at least one roadway edge;
e) obtaining hypothetical values of a number of lanes on the roadway;
f) forming respective quotients of the edge distance respectively divided by the respective hypothetical values of the number of lanes;
g) comparing the quotients to the valid lane width range; and
h) determining an estimated lane width of a lane on the roadway as one of the quotients that falls within the valid lane width range.

16. The method according to claim 15, further comprising determining an estimated number of lanes on the roadway by dividing the edge distance by the estimated lane width.

17. The method according to claim 1, wherein said sensor system comprises a radar sensor or a lidar sensor which outputs radar data or lidar data, respectively, as said sensor data.

18. The method according to claim 1, which expressly excludes recognizing any lane markings on the roadway.

19. A method for a driver assistance system for a subject vehicle that drives on a roadway and that is equipped with a sensor system arranged to monitor a detection area along the roadway, wherein the method comprises the steps:
a) in a processing circuit of the driver assistance system, obtaining a lane width value of a lane width of a lane of the roadway;
b) in the processing circuit, evaluating sensor data from the sensor system and from the sensor data determining at least one lateral spacing distance relative to the subject vehicle, said at least one lateral spacing distance being selected from a lateral spacing distance of another vehicle that is overtaking the subject vehicle, a lateral spacing distance of another vehicle that ,is being overtaken by the subject vehicle, a lateral spacing distance of an oncoming vehicle that is approaching the subject vehicle, and a lateral spacing distance of a following vehicle that is following behind and laterally offset from the subject vehicle;
c) in the processing circuit, comparing the at least one lateral spacing distance with the lane width value to produce a comparison result; and
d) in the processing circuit, from the comparison result, determining an estimated number of lanes on the roadway.

20. The method according to claim 19, wherein the lane width value is a predefined nominal lane width value, and wherein in the step a), the obtaining of the predefined nominal lane width value comprises setting or selecting the predefined nominal lane width value dependent on a speed of the subject vehicle or of objects detected by the sensor system.

21. The method according to claim 19, further comprising, in the processing circuit, determining an actual lane width from the at least one lateral spacing distance determined in the step b) and the estimated number of lanes determined in the step d).

\* \* \* \* \*